UNITED STATES PATENT OFFICE.

AUGUST LEOPOLD LASKA, OF OFFENBACH-ON-THE-MAIN, GERMANY, ASSIGNOR TO CHEMISCHE FABRIK GRIESHEIM-ELEKTRON, OF FRANKFORT-ON-THE-MAIN, GERMANY, A CORPORATION.

BLACK MORDANT AZO DYE.

No. 863,290.     Specification of Letters Patent.     Patented Aug. 13, 1907.

Application filed March 22, 1907. Serial No. 363,939.

*To all whom it may concern:*

Be it known that I, AUGUST LEOPOLD LASKA, doctor of philosophy, chemist, and a resident of 5 Gerberstrasse, Offenbach-on-the-Main, in the Grand Duchy of Hessen, Germany, have invented new and useful Improvements in Black Mordant Azo Dyestuffs, of which the following is a specification.

My invention relates to the production of new mordant monoazo dyestuffs which may be obtained by combining the diazo compounds of ortho-amidophenol bodies of the general formula $$\overset{1}{\phantom{C}}\overset{2}{\phantom{C}}$$
$$C_6H_2.X.Y.OH.\ NH_2$$

wherein X and Y means H, $CH_3$, Cl, $NO_2$, COOH and wherein that the same derivative contains no more than one $NO_2$ group, with 2:8 dioxynaphthalene 6 sulfoacid.

I have further found that the formation of the coloring matter best takes place in presence of slaked lime.

The thus obtained dyestuffs dye wool from acid bath bordeaux to black violet shades which, by subsequent treatment with chromates, are converted into violet-black to deep-black ones of excellent fastness to milling and potting process and against light.

The following example will show how the new coloring matter can be obtained; the parts being by weight: 35.8 parts of para-chloro-ortho-amidophenol are dissolved in 300 parts of water cooled with ice and diazotized by means of 17,3 parts of sodium nitrite. The diazo solution is poured into a solution of 60 parts of 2:8 dioxynaphthalene 6 sulfoacid in 600 parts of water, previously cooled with ice, and 75 parts of well slaked lime are added. The mixture is well stirred till the formation of the dyestuff is completed, heated up to 70° C and the dyestuff precipitated by addition of a slight excess of hydrochloric acid, filtered off, dried and mixed with the necessary quantity of sodium carbonate as to form the sodium salt. The lime can be separated from the liquid in form of this carbonate by addition of sodium carbonate. From the filtered solution the dyestuff can be separated in the well known manner. It is a brown black powder dissolving in concentrated sulfuric acid to a blackish blue, in water to a reddish violet solution. This solution turns somewhat bluer by addition of caustic soda lye, and blue by addition of an excess of carbonate of sodium. The quantity of slaked lime may be varied within wide limits.

The dyestuffs from the diazo compounds of ortho-amidophenol, its homologues and derivatives may be prepared in the same manner.

The tinctorial properties of a greater number of the new dyestuffs may be shown by the following table:

| Dyestuff prepared by combination of 2:8 dioxynaphthalene 6 sulfonic acid with diazotized | Dyes wool | |
|---|---|---|
| | From acid bath | By subsequent treatment with chromates: |
| Ortho-amidophenol | Bordeaux | Violet-black. |
| Para-chloro-ortho-amidophenol. | " | " |
| Dichloro-ortho-amidophenol.  $OH:NH_2:Cl:Cl=1.2.4.6$ | Bordeaux | Blue-black. |
| Nitroamidophenol  $OH:NH_2:NO_2$  1  2  4.............  1  2  5............. | Bordeaux  " | Deep-black  Greenish-black |
| Chloroamidokresol..........  $OH:NH_2:CH_3:Cl$  1  2  4  6 | Bordeaux | Violet-black |
| Nitroamidokresol  $OH:NH_2:CH_3:NO_2$  1  2  4  6............ | Bluish bordeaux. | Blue-black |
| Nitrochloramidophenol  $OH:NH_2:Cl:NO_2$  1  2  4  6............  1  2  6  4............ | Black violet.....  Black-violet brown | Blue-black  Green-black |
| Ortho-amido-para-kresotinic acid:  $OH:NH_2:CH_3:COOH$  1  2  4  6 | Bluish bordeaux. | Violet-black |
| Nitroamido para-oxybenzoic acid  $OH:NH_2:COOH:NO_2$......  1  2  4  6 | Black-violet..... | Black |

Now what I claim and desire to secure by Letters Patent is the following:

1. The process of manufacturing new mordant monoazo dyestuffs, which consists in combining the diazo compounds of ortho-amidophenol bodies of the general formula:

$$\overset{1}{\phantom{C}}\overset{2}{\phantom{C}}$$
$$C_6H_2.X.Y.OH:NH_2,$$

where X and Y may be H, $CH_3$, Cl, $NO_2$, COOH and wherein that one and the same derivative contains no more than one $NO_2$ group, with 2:8 dioxynaphthalene 6 sulfonic acid.

2. The process of manufacturing new mordant monoazo dyestuffs which consists in combining in presence of slaked lime the diazo compounds of ortho-amidophenol bodies of the general formula:

$$\overset{1}{\phantom{C}}\overset{2}{\phantom{C}}$$
$$C_6H_2.X.Y.OH.NH_2,$$

where X and Y may be H, $CH_3$, Cl, $NO_2$, COOH and wherein that one and the same derivative contains no more than one $NO_2$ group with 2:8 dioxynaphthalene 6 sulfo acid.

3. As a new article of manufacture the mordant monoazo dyestuffs obtained by combining the diazo compounds of ortho-amidophenol bodies of the general formula $$\overset{1}{C_6} H_2 . X . \overset{2}{Y} . OH : NH_2,$$

where X and Y may be H, $CH_3$, Cl, $NO_2$ COOH and wherein that one and the same derivative contains no more than one $NO_2$ group with 2:8 dioxynaphthalene 6 sulfonic acid, being brown black powders, soluble in concentrated sulfuric acid to a bordeaux to deep-violet solution, in water to a bordeaux to blue one, dyeing cotton from acid bath bordeaux to black-violet shades, which by subsequent treatment with chromates, turn violet-black to deep black.

In testimony, that I claim the foregoing as my invention, I have signed my name in presence of two witnesses, this seventh day of March 1907.

AUGUST LEOPOLD LASKA.

Witnesses:
EVA SATTLER,
HERMANN WEIL.